United States Patent [19]

Thomas et al.

[11] Patent Number: 5,116,563
[45] Date of Patent: May 26, 1992

[54] PROCESS FOR PRODUCING A MECHANICAL FASTENER

[75] Inventors: Dennis A. Thomas; David J. K. Goulait, both of Cincinnati, Ohio

[73] Assignee: The Procter & Gamble Company, Cincinnati, Ohio

[21] Appl. No.: 546,198

[22] Filed: Jun. 28, 1990

[51] Int. Cl.⁵ .............................. B29C 67/02
[52] U.S. Cl. ...................... 264/167; 24/442; 156/66; 156/242; 156/245; 264/251; 604/391
[58] Field of Search ............... 264/164, 167, 251; 156/66, 242, 245; 24/442, 578; 604/391

[56] References Cited

U.S. PATENT DOCUMENTS 5,013,498  5/1991  Froeschke ........................ 264/164

FOREIGN PATENT DOCUMENTS 55-137942  10/1980  Japan ........................ 264/167

Primary Examiner—Jan H. Silbaugh
Assistant Examiner—Brian J. Eastley
Attorney, Agent, or Firm—L. L. Huston; S. W. Miller; R. C. Witte

[57] ABSTRACT

An improved process for forming a mechanical fastening prong and the prongs produced thereby. The prongs are produced by deposition of a heated, thermally sensitive material onto a substrate, which is transported at a differential velocity relative to the heated material being deposited to form the prongs. Also, the transported substrate may be drawn away from the point of deposition at an angle. By varying the velocity differential between the substrate and the heated, thermally sensitive material as it is deposited and by varying the angle between the substrate and the point of deposition of the heated thermally sensitive material, the fastening characteristics, particularly the shear strength, of the fastening system formed of these prongs may be advantageously modified.

13 Claims, 3 Drawing Sheets

PROCESS FOR PRODUCING A MECHANICAL FASTENER

FIELD OF THE INVENTION

The present invention relates to fastenable mechanical fastening systems, and more particularly to a process for producing a fastening system having improved structural and fastening characteristics.

BACKGROUND OF THE INVENTION

Refastenable mechanical fastening systems are well known in the art. Typically such fastening systems involve two major components, a prong which is joined to a substrate and engages a complementary second component, a receiving surface. The receiving surface typically comprises one or more layers of strands or fibers.

A projection of the prong of the mechanical fastening system, typically referred to as the engaging means, penetrates the receiving surface and engages or intercepts strands or fibers of the receiving surface. The resulting mechanical interference and physical obstruction prevent removal of the prong from the receiving surface until separation forces exceed either the peel or the shear strength of the fastening system.

Oftentimes one skilled in the art wishes to select or tailor the fastening characteristics of the mechanical fastening system to the desired application for the mechanical fastening system. In certain applications the shear strength of the fastening system becomes important (if not critical) and the designer may wish to tailor the shear strength of the mechanical fastening prong to the needs of such applications.

For example, refastenable mechanical fastening systems may be used in conjunction with disposable absorbent articles such as diapers. U.S. Pat. No. 4,846,815, issued Jul. 11, 1989 to Scripps discloses a diaper having a refastenable fastening device which provides resistance to commonly encountered shear stresses and which is comfortable and skin friendly to the wearer. U.S. Pat. No. 4,869,724, issued Sep. 26, 1989 to Scripps discloses a disposable absorbent article with adhesive tape tabs and refastenable mechanical fasteners used in conjunction with one another to provide for refastening of the disposable absorbent article about the wearer and convenient disposal of the diaper after it has become soiled.

If the refastenable mechanical fastening system is used in conjunction with a disposable absorbent article, such as a diaper, a certain minimum shear strength is necessary to minimize the chances of the mechanical fastening system becoming detached during wear, thus allowing the garment to possibly loosen or even fall off the wearer. This occurrence increases the likelihood of the absorbent garment not properly containing bodily discharges intended to be absorbed by the disposable absorbent article.

If the disposable absorbent article is an adult incontinence product, refastenable mechanical fastening systems may likewise be advantageously utilized, as disclosed in commonly assigned U.S. patent application Ser. No. 07/382,157, Issue Batch No. F40, filed Jul. 18, 1989, in the names of Gipson et al. However, contrary to the need, disclosed above, for the fastening systems to maintain a certain minimum shear strength, a mechanical fastening system used in conjunction with an adult incontinence product may need to have only a certain maximum shear strength. The difference occurs because the wearer may be of limited manual strength or dexterity, and if the shear strength of the fastening system is too great, the wearer may not be able to conveniently remove the disposable absorbent garment to inspect for soiling or for routine changing of the garment.

In yet another application, it may be desirable to have a mechanical fastening system which allows for some slippage of the prong, relative to the receiving surface, in a direction generally parallel the plane of the receiving surface and the direction in which fastening engagement is desired. Such lateral slippage produces a fastening system which is somewhat adjustable in the relative position of the prongs on the receiving surface while the two components are fastened together.

Other characteristics, such as the structural characteristics or the geometry, of the mechanical fastening systems may also be important. One skilled in the art may also wish to tailor these characteristics of the fastening system. For example, the lateral projection of the prongs may be tailored to a value which makes the prongs complementary to a particularly desired receiving surface. Another structural characteristic, the included angle of the prong relative to the substrate, influences the depth the prong penetrates the receiving surface. Thus, the designer may also wish to tailor this characteristic of the geometry of the fastening system, commensurate with the layers and the fiber or strand strength of the receiving surface and the desired shear strength of the fastening system.

Particularly, it has been found that there is a definite relationship between the included angles of the prongs relative to the plane of the substrate and the shear strength of the fastening system. Further, there is a relationship between certain parameters of the manufacturing process and the included angles of the prongs resulting from such processes.

Accordingly, it is an object of this invention to provide a process for conveniently adjusting tailoring the fastening characteristics, particularly the shear strength of mechanical fastening prongs, as the mechanical fastening system is produced. It is also an object of this invention to provide a process for adjusting the lateral projections of mechanical fastening prongs and the included angles of mechanical fastening prongs relative to the substrate during production of the mechanical fastening system. It is finally an object of this invention to provide a mechanical fastening prong which may laterally slip parallel to the plane of the receiving surface after engagement has taken place and while the mechanical fastening prong and receiving surface are fastened together.

BRIEF SUMMARY OF THE INVENTION

The invention comprises a refastenable fastening system of mechanical prongs for attaching to a complementary receiving surface and the process for producing such a refastenable fastening system. The prongs of the refastenable fastening system has a substrate and at least one free formed prong comprising a base, a shank, and an engaging means. The base of the prong is joined to the substrate and the shank is contiguous with and projects outwardly from the base. The engaging means is joined to the shank and projects laterally beyond the periphery of the shank.

The fastening system may be made according to the process comprising the steps of providing a thermally sensitive material and heating it to the melting point. A means to deposit discrete amounts of the heated thermally sensitive material onto a substrate and a substrate to which the heated thermally sensitive material may be joined are provided.

The substrate is transported in a first direction and at a first velocity relative to the depositing means. Discrete amounts of the thermally sensitive material are deposited in a second direction onto the transported substrate. The substrate is drawn away from the depositing means at an obtuse angle between and defined by the first and second directions.

In a different execution, the process for producing the mechanical fastening system increases the shear strength of a mechanical fastening prong. This process comprises the steps of transporting the heated, thermally sensitive material and the substrate relative to one another. Discrete amounts of the heated, thermally sensitive material are deposited onto the substrate so that a positive velocity differential between the transported substrate and the heated, thermally sensitive material being deposited occurs.

These processes may be advantageously carried out using a printing roll having a plurality of cells disposed about its periphery. Heated, thermally sensitive material is deposited into the cells. The print roll is axially rotated about its centerline and the substrate is transported the first direction and velocity in contacting relation with the cells. The heated, thermally sensitive material is then deposited from the cells onto the substrate.

If desired, a backing roll may be juxtaposed with the print roll to define a nip and a nip plane. The substrate is transported through the nip in contacting relation with the cells of the print roll. The substrate is drawn away from the nip at a predetermined acute angle relative to the nip plane. The substrate may be drawn through the nip at a velocity which is generally not equivalent the peripheral velocity of the print roll.

In the process for increasing the shear strength of a mechanical fastening system, the substrate is drawn away from the depositing means at a differential velocity or at an obtuse angle. If the aforementioned nip and roll structure is utilized, this arrangement produces an acute angle between the substrate and the plane of the nip.

BRIEF DESCRIPTION OF THE DRAWINGS

While the Specification concludes with claims particularly pointing out and distinctly claiming the present invention, it is believed the invention is better understood from the following description taken in conjunction with the associated drawings, in which like elements are designated by the same reference numeral and:

DETAILED DESCRIPTION OF THE INVENTION

Figure 1:
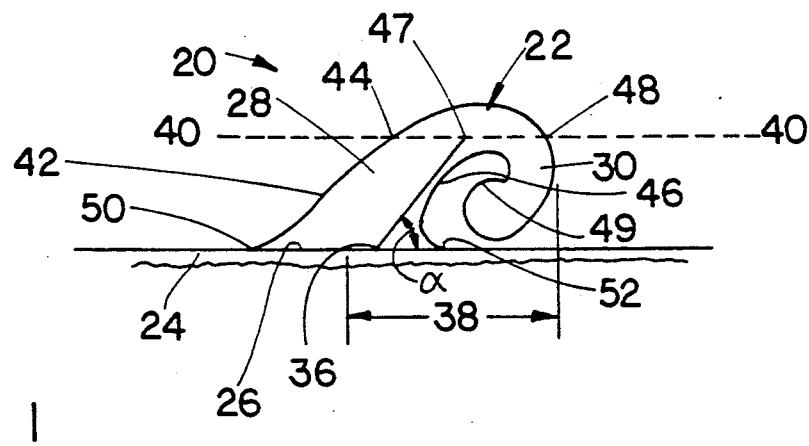
FIG. 1 is a side elevational profile view of one prong of a fastening system according to the fastening system of the present invention.

The fastening system 20 of the present invention comprises at least one prong 22 as shown in FIG. 1, and preferably an array of prongs 22. Each prong 22 of the array may be joined to a substrate 24 in a predetermined pattern. Each of the prongs 22 has a base 26, shank 28 and an engaging means 30. The bases 26 of the prongs 22 contact and are joined to the substrate 24, and support the proximal ends of the shanks 28. The shanks 28 project outwardly from the substrate 24 and bases 26. The shanks 28 terminate at a distal end which is joined to an engaging means 30.

The engaging means 30 radially projects laterally from the shanks 28 in one or more directions and may resemble a hook-shaped tine. As used herein, the term "lateral" means having a vector component generally parallel to the plane of the substrate 24 at the principal prong 22 under consideration. The projection of an engaging means 30 from the shank 28 periphery in a lateral direction allows the engaging means 30 to be secured to a complementary receiving surface (not shown). The engaging means 30 is joined to, and preferably contiguous with, the distal end of the prong 22. It will be apparent the engaging means 30 may be joined to the prong 22 at a position between the base 26 and the distal end of the shank 28.

Figure 2:
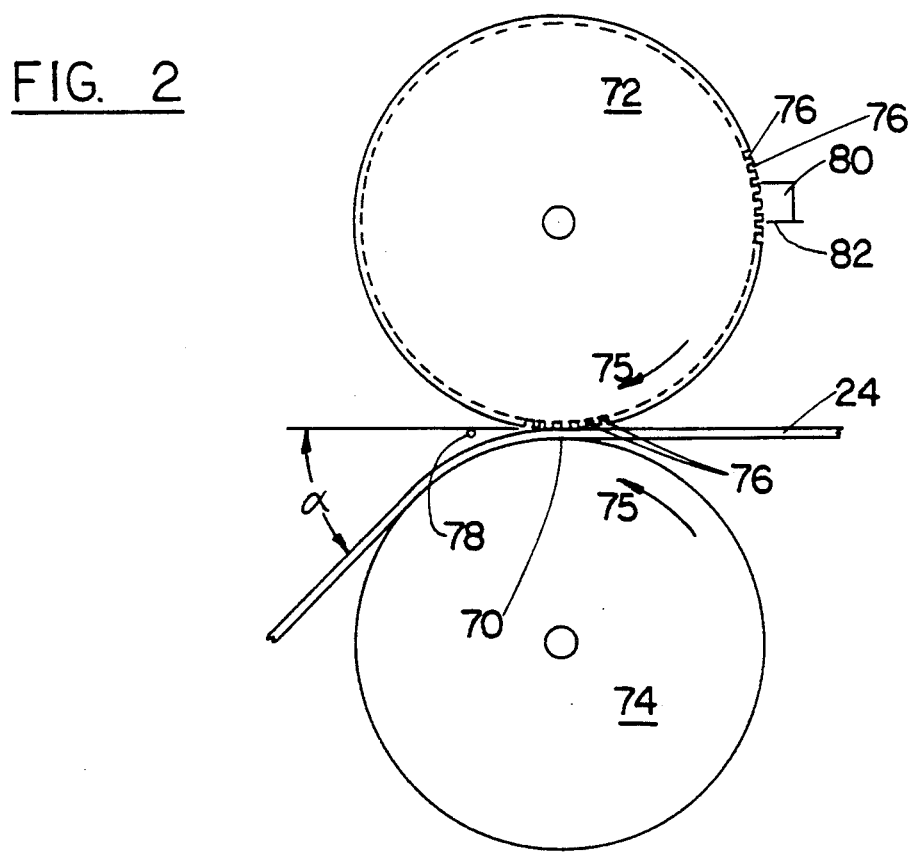
FIG. 2 is a side elevational schematic view of one apparatus which can be used to produce a prong according to the fastening system of the present invention.

As illustrated in FIG. 2, the array of prongs 22 is produced by any suitable apparatus and method, including methods which yield a free formed prong 22 as described and claimed hereinbelow. As used herein, the term "free formed" means a structure which is not removed from a mold cavity or extrusion die in solid form or with a defined shape. The prongs 22 are deposited onto a substrate 24 in a molten, preferably liquid state, and solidify by cooling until rigid and preferably freezing, into the desired structure and shape as described hereinafter.

The free formed prong 22 or array of prongs 22 may be produced by a manufacturing process which is similar to that process commonly known as gravure printing. Using this process, a generally planar substrate 24 having opposed faces is passed between the nip 70 of two generally cylindrical rolls, a print roll 72 and a backing roll 74, as illustrated at FIG. 2. The rolls 72 and 74 have generally parallel centerlines and are maintained in contacting relationship with the substrate 24 as it passes through the nip 70. One of the rolls, particularly referred to as the print roll 72, has an array of blind, closed-end cavities, referred to as cells 76, corresponding to the desired pattern of prongs 22 to be deposited on the substrate 24. The second roll, referred to as the backing roll 74, provides the support and reaction against the print roll 72 to position the substrate 24 against the print roll 72 as the substrate 24 passes through the nip 70.

Thermally sensitive material, preferably thermoplastic material, from which the prongs 22 are to be formed is supplied from a heated source, such as a trough 80. The thermally sensitive material is heated, preferably to at least its melting point. The thermally sensitive material is introduced into the cells 76 as the print roll 72 is rotated about its centerline. The cells 76 containing the thermally sensitive material transport it until contact with the substrate 24 is made and deposit the heated, thermally sensitive material onto the substrate 24 in the desired pattern.

As relative displacement between the substrate 24 and rolls 72 and 74 continues, the prongs 22 are stretched in a direction having a lateral component, generally parallel to the plane of the substrate 24, forming the shank 28 and the engaging means 30. Finally, the moil of the prong 22 may be severed from the engaging means 30 by a severing means 78. However, the severing means 78 may be omitted and this prong separated from its moil without the use of a dedicated severing means 7i, providing the parameters to which the fastening system 20 is produced accommodate severing without such a dedicated severing means 78. Due to the viscoelastic properties of the thermoplastic material, the prong 22 retracts under the influences of gravity and shrinkage which occur during cooling. The prong 22 then cools, and preferably freezes, into a solid structure having the engaging means 30 contiguous with the shank 28.

The fastening system 20 is secured to a complementary receiving surface. As used herein, the term "receiving surface" to which the engaging means 30 of the prongs 22 of fastening system 20 are secured refers to any plane or surface having an exposed face with tightly spaced openings complementary to the engaging means 30 and defined by one or more strands or fibers or, alternatively, which exposed face is capable of localized elastic deformation so that the engaging means 30 may become entrapped and not withdrawn without interference. The openings or localized elastic deformations allow for entry of the engaging means 30 into the plane of the receiving surface, while the strands (or nondeformed material) of the receiving surface interposed between the openings (or deformed areas) prevent withdrawal or release of the fastening system 20 until desired by the user or either the peel or shear strength of the fastening system 20 is otherwise exceeded. The plane of the receiving surface may be flat or curved.

A receiving surface having strands or fibers, is said to be "complementary" if the openings between strands or fibers are sized to allow at least one engaging means 30 to penetrate into the plane of the receiving surface, and the strands are sized to be engaged or intercepted by the engaging means 30. A receiving surface which is locally deformable is said to be "complementary" if at least one engaging means 30 is able to cause a localized disturbance to the plane of the receiving surface, which disturbance resists removal or separation of the fastening system 20 from the receiving surface.

Suitable receiving surfaces include reticulated foams, knitted fabrics, nonwoven materials, and stitchbonded loop materials, such as Velcro brand loop materials sold by Velcro U.S.A. of Manchester, N.H. Particularly suitable receiving surfaces are stitchbonded fabric model number 970026 sold by the Milliken Company of Spartanburg, S.C.; and model number 16110 fabric by Guilford Mills of Greensboro, N.C.

Referring back to FIG. 1 to examine the components of the fastening system 20 and of individual prongs 22 in more detail, the substrate 24 of the fastening system 20 should be strong enough to preclude tearing and separation between individual prongs 22 of the fastening system 20, be a surface to which the prongs 22 will readily adhere and be capable of being joined to an article to be secured as desired by a user. As used herein the term "join" refers to the condition where a first member, or component, is affixed, or connected to a second member or component, either directly; or indirectly, where the first member or component is affixed or connected to an intermediate member, or component which in turn is affixed, or connected, to the second member or component. The association between the first member, or component, and the second member, or component, is intended to remain for the life of the article. The "substrate" is any exposed surface to which one or more prongs 22 are joined.

The substrate 24 should also be capable of being rolled, to support conventional manufacturing processes, flexible so that the substrate 24 may be bent and flexed in a desired configuration, and be able to withstand the heat of the liquid prongs 22 being deposited thereon without melting or incurring deleterious effects until such prongs 22 freeze. The substrate 24 should also be available in a variety of widths. Suitable substrates 24 include knitted fabrics, woven materials, nonwoven materials, rubber, vinyl, films, particularly polyolefinic films and preferably kraft paper. White kraft paper having a basis weight of 0.08 kilograms per square meter (50 pounds per 3,000 square feet) has been found suitable.

The base 26 of the prong 22 is the generally planar portion of the prong 22 which is attached to the substrate 24 and is contiguous with the proximal end of the shank 28 of the prong. As used herein, the term "base" refers to that portion of the prong 22 which is in direct contact with the substrate 24 and supports the shank 28 of the prong 22. It is not necessary that a demarcation be apparent between the base 26 and the shank 28 of the prong 22. It is only important that the shank 28 not separate from the base 26 and that the base 26 not separate from the substrate 24 during use.

The base 26 cross section should provide sufficient structural integrity, and hence area, for the desired peel and shear strengths of the fastening system 20, based on the density of the pattern of prongs 22 and length of the shanks 28 of the individual prongs 22 and further provide adequate adhesion to the substrate 24. If a longer shank 28 is utilized, the base 26 should generally be of greater cross sectional area to provide sufficient adhesion to the substrate 24 and adequate structural integrity.

The shape of the footprint of the base 26 on the substrate 24 is not critical, and may be amplified in any direction to provide greater structural integrity and thus a greater peel strength in that direction. As used herein, the term "footprint" refers to the planar contact area of the base 26 on the substrate 24. The aspect ratio of the sides of the footprint should not be too great, otherwise the prong 22 may be unstable when subjected to forces parallel to the shorter side of the footprint. An aspect ratio of less than about 1.5:1 is preferred, and a generally circular footprint is more preferred.

For the embodiment described herein, a base 26 having a footprint of generally circular shape and approximately 0.76 millimeters to 1.27 millimeters (0.030 to 0.050 inches) in diameter is suitable. If it is desired to make the fastening system 20 have a greater peel or shear strength in a particular direction, the cross sectional area of the base 26 may be modified to amplify such direction, so that the strength and structural integrity relative to the axis orthogonal to such direction increases. This modification causes the prongs 22 to be stronger when pulled in the amplified direction of the base 26.

The shank 28 is contiguous with the base 26 and projects outwardly from the base 26 and substrate 24. As used herein, the term "shank" refers to that portion of the prong 22 which is intermediate of and contiguous with the base 26 and the engaging means 30. The shank 28 provides longitudinal spacing of the engaging means 30 from the substrate 24. As used herein, the term "longitudinal" means in a direction having a vector component away from the substrate 24, which direction increases the perpendicular distance to the plane of the substrate 24 at the base 26 of the prong 22, unless otherwise specified to be a direction having a vector component towards such plane of the substrate 24.

Associated with the shank 28 and base 26 of each prong 22 is an origin 36. The "origin" of the shank 28 is the point which may be thought of as the center of the base 26, and is typically within the footprint of the base 26. The origin 36 is found by viewing the prong 22, from the side view. The "side view" is the view taken any direction radially towards the shank 28 and base 26 which is also parallel to the plane of the substrate 24. If the fastening system 20 is manufactured according to the process described and claimed below, it is preferred, but not necessary, that the prong 22 be viewed in the cross-machine directions, relative to the travel of the substrate 24 through the nip 70, when determining the origin 36.

The lateral distance between the remote edges of the base 26 footprint for the particular side view under consideration is found, and this distance is bisected, yielding the midpoint of the base 26 for such view. When bisecting the footprint of the base 26 for the particular side view under consideration, minor discontinuities (such as fillets or asperities incident to the attachment to substrate 24) are ignored. This point is the origin 36 of the shank 28.

The shank 28 makes an angle with the plane of the substrate 24. As used herein, the term "plane of the substrate" refers to the flat, planar surface of the substrate 24 at the base 26 of the principal prong 22 under consideration. The angle α is determined as follows. The prong 22 is viewed in profile. The "profile view" of the prong 22 is either one of two particular side views and found as follows. The prong 22 is visually inspected from the side views such that the direction having the maximum lateral projection 38 becomes apparent. The "lateral projection" is the distance taken laterally and parallel to the plane of the substrate 24 from the center of the base 26 in such view, i.e. the origin 36 of the shank 28, to the projection of the furthest laterally remote point on the prong 22 visible in such view when such point is longitudinally and perpendicularly projected downward to the plane of the substrate 24.

It will be apparent to one skilled in the art that the maximum lateral projection 38 is that distance to the outer periphery of the shank 28 or engaging means 30 from the opposite side of the base 26. The side view of the prong 22 which maximizes the lateral projection 38 is the profile view of such prong 22. It will also be apparent to one skilled in the art that if the fastening system 20 is produced by the process described and claimed below, the maximum lateral projection 38 is typically parallel the machine direction and, hence, the profile view is typically oriented in the cross-machine direction. The side elevational view shown in FIG. 1 is one of the profile views of the prong 22. It will be further apparent to one skilled in the art that there is another profile view, generally 180° opposite from the profile view shown (so that the maximum lateral projection 38 is oriented towards the left of the viewer). Either of the two profile views is generally equally well suited for the processes described hereinbelow.

The origin 36 of the shank 28 is found, as described above, with the prong 22 in the profile view. While still maintaining the prong 22 in the profile view, an imaginary cutting plane 40—40, generally parallel to the plane of the substrate 24, is then brought into tangency with the periphery of the prong 22 at the point or segment of the prong 22 having the greatest perpendicular distance from the plane of the substrate 24. This corresponds to the portion of the prong 22 having the highest elevation. The perpendicular distance from the imaginary cutting plane 40—40 to the face of the substrate 24 to which the bases 26 of the prongs 22 are joined defines the "height" of prong 22. The imaginary cutting plane 40—40 is then brought one-fourth of such greatest perpendicular distance closer to the substrate 24 from the point of highest elevation, so that the imaginary cutting plane 40—40 intercepts the prong 22 at an elevation three-fourths of the perpendicular distance from the plane of the substrate 24 to the point of the prong 22 longitudinally furthest from such substrate 24.

The imaginary cutting plane 40—40 is then used to determine three points on the prong 22. The first point is that point where the cutting plane intercepts the leading edge 42 of the prong 22 and is referred to as the 75% leading point 44. The "leading edge" is the apex of the periphery of the shank 28 which longitudinally faces away from the plane of the substrate 24. The second point is disposed about 180° through the center of the prong 22 and is the point where the cutting plane 40—40 intercepts the trailing edge 46 of the prong 22 and is referred to as the 75% trailing point 48. The "trailing edge" is the apex of the periphery of the shank 28 which longitudinally faces towards the substrate 24 and is generally oppositely disposed from the leading edge 42. The straight line connecting these two points falls, of course, within the cutting plane 40—40 and is bisected to yield the midpoint 47 of the imaginary cutting plane 40—40. A straight line is then drawn connecting the midpoint 47 of the imaginary cutting plane 40—40 with the origin 36 of the shank 28 at the base 26. The included angle α this line defines relative to the plane of the substrate 24 is the angle α of the shank 28.

Alternatively stated, the angle α which the shank 28 makes relative to the plane of the substrate 24 is the 90° complement of that angle furthest from the perpendicular defined by the line, found in any side view, connecting the cutting plane midpoint 47 and the origin 36. Hence, the smallest angle relative to the plane of the substrate 24 when this line is viewed in any direction radially towards the shank 28, and particularly the origin 36, which direction is generally parallel to the plane of the substrate 24 and orthogonal to the perpendicular is the angle α of the shank 28. It is to be recognized that when the prong 22 is viewed approximately in the machine direction, or approximately 180° therefrom, the apparent angle α of the shank 28 will be about 90°. However, as discussed above, the angle α to be measured is that which deviates furthest from the perpendicular and, therefore, is generally that angle α determined when the prong 22 is viewed in profile, typically from about the cross-machine direction.

The angle α of the shank 28 may be generally perpendicular to the plane of the substrate 24, or is preferably oriented in an acute angular relation relative thereto to provide the desired strength in a particular direction, which direction is generally parallel to the maximum longitudinal projection 38. However, as the angle α of the shank 28 deviates more from the perpendicular, more laterally directionally specific shear strength results. For the embodiment described herein, a shank 28 having an angle α between about 30° and about 70°, preferably about 65°, works well. In any case, if the angle of the shank 28 is less than about 80°, the shank 28 is considered to be nonperpendicularly oriented relative to the plane of the substrate 24 (without regard to lateral orientation).

The engaging means diameter 49 is also measured from the profile view. This is the maximum diameter of a bulge near the distal end of the engaging means 30 and is generally orthogonal the projection of the centerline of the shank 28 and engaging means 30.

The foregoing measurements are easily made using a Model 100-00 115 goniometer sold by Rame'-Hart, Inc. of Mountain Lakes, N.J. If more precise measurement is desired, it will be recognized by one skilled in the art that determination of the profile view, origin 36, cutting plane 40—40, 75% points 44, 47 and 48, and the angle α of the shank 28 can be advantageously performed by making a photograph of the prong 22 and scaling from this photograph. A model 1700 scanning electron microscope sold by Amray, Inc. of New Bedford, Mass. has been found to work well for this purpose. If necessary, several photographs may be taken to determine the maximum lateral projection 38 and either profile view.

The shank 28 should longitudinally project from the base 26 a distance sufficient to space the engaging means 30 from the substrate 24 at an elevation which allows the engaging means 30 to readily intercept or engage the strands of the receiving surface. A relatively longer shank 28 provides the advantage that it can penetrate deeper into the receiving surface and thereby allow the engaging means 30 to intercept or engage a greater number of strands or fibers. Conversely, a relatively shorter shank 28 length provides the advantage that a relatively stronger prong 22 results, but also provides correspondingly less penetration into the receiving surface and may therefore be unsuitable for receiving surfaces such as wool or loosely stitched bonded materials which have less densely packed strands or fibers.

If a knitted or woven material receiving surface is utilized, a relatively shorter shank 28 having a longitudinal length from the substrate 24 to the point or segment of highest elevation of about 0.5 millimeters (0.020 inches), preferably at least about 0.7 millimeters (0.028 inches), is suitable. If a high loft material receiving surface having a caliper greater than about 0.9 millimeters (0.035 inches) is utilized, a relatively longer shank 28 having a greater longitudinal dimension of at least about 1.2 millimeters (0.047 inches), preferably at least about 2.0 millimeters (0.079 inches), is more suitable. As the shank 28 length increases, and shear strength correspondingly diminishes, the density of the prongs 22 of the fastening system 20 may be increased to compensate for such loss of shear strength.

As described above, the longitudinal length of the shank 28 determines the longitudinal spacing of the engaging means 30 from the substrate 24. The "longitudinal spacing" is the least perpendicular distance from the plane of the substrate 24 to the periphery of the engaging means 30. For an engaging means 30 of constant geometry, the longitudinal spacing of the engaging means 30 from the substrate 24 becomes greater with increasing longitudinal shank 28 length. A longitudinal spacing of at least about twice the strand or fiber diameter of the intended receiving surface, and preferably about 10 times as great as such fiber or strand diameter provides good interception or engagement and retention of such strands or fibers by the engaging means 30 of the fastening system 20. For the embodiment described herein, a prong 20 having a longitudinal spacing of about 0.2 millimeters to about 0.8 millimeters (0.008 to 0.03 inches) typically works well.

The shape of the cross section of the shank 28 is not critical. Thus the shank 28 may be of any cross section desired, according to the aforementioned parameters relating to the cross section of the base 26. The "cross section" is the planar area of any part of the prong 22 taken perpendicular to the shank 28 or the engaging means 30. The shank 28 is preferably tapered to decrease in cross section as the distal end of the shank 28 and engaging means 30 of the prong 22 are longitudinally and laterally approximated. This arrangement provides a corresponding decrease in the moment of inertia of the shank 28 and engaging means 30 resulting in a prong 22 of more nearly constant stress when separation forces are applied to the fastening system 20, and thereby diminishes the quantity of superfluous materials incorporated into the prong 22.

To maintain the desired geometry over a wide range of prong 22 sizes, a generally uniform ratio of cross sectional areas can be utilized to scale the prongs 22. One ratio which generally controls the overall taper of the prong 22 is the ratio of the area of the cross section of the base 26 to the area of the cross section of the prong 22, at the highest elevation of the prong 22. As noted above, the phrase "highest elevation" refers to the that point or segment of the shank 28 or the engaging means 30 having the greatest perpendicular distance from the plane of the substrate 24. Typically, prongs 22 having a base 26 cross sectional area to highest elevation cross sectional area ratio in the range of about 4:1 to about 9:1 work well.

A generally circular shank 28 which tapers from a base 26 diameter, as discussed above, ranging from about 0.76 millimeters to about 1.27 millimeters (0.030 to about 0.050 inches) to a highest elevation diameter, of about 0.41 millimeters to about 0.51 millimeters (0.016 to 0.020 inches) has been found suitable for the embodiment discussed herein. Specifically, a generally circular shaped cross section of about 0.46 millimeters (0.018 inches) diameter at the highest elevation provides a cross sectional area at highest elevation of about 0.17 square millimeters (0.0003 square inches). A generally circular shaped base 26 cross section of about 1.0 millimeters (0.040 inches) provides a base 26 cross sectional area of about 0.81 square millimeters (0.0013 square inches). This structure results in a ratio of base 26 cross sectional area to highest elevation cross sectional area of about 5:1, which is within the aforementioned range.

The engaging means 30 is joined to the shank 28, and preferably is contiguous with the distal end of the shank 28. The engaging means 30 projects radially away and outwardly from the periphery of shank 28, and may further have a vector component which longitudinally projects, i.e. is oriented towards or away from the substrate 24. As used herein the term "engaging means" refers to any protrusion lateral to the periphery of shank 28 (other than minor asperities on the periphery of the shank 28), which protrusion resists separation or removal from a receiving surface. The term "periphery" means the outer surface of the prong 22. The term "radially" means from or towards the perpendicular to the substrate 24, which perpendicular passes through the origin 36 which is generally centered within the footprint of the base 26.

Particularly, the lateral protrusion has a vector component parallel to and facing towards the plane of the substrate 24. It is to be recognized that the engaging means 30 and shank 28 may have both lateral and longitudinal vector components. It is not important that a sharply defined terminus of the shank 28 distal end be apparent, or that a demarcation between the shank 28 and engaging means 30 be discernible at all. It is only necessary that a longitudinally oriented face of the shank 28 periphery be interrupted so that the engaging means 30 has a face with a vector component parallel to and facing the plane of the substrate 24.

The engaging means 30 may have a greater lateral projection 38 than the shank 28, or vice-versa, as desired. As illustrated in the figures, the engaging means 30 is preferably generally arcuate and may have a reentrant curve. If the engaging means 30 has a reentrant curve, the engaging means 30 includes a segment which longitudinally approximates the substrate 24 at the base 26 or a location laterally spaced from the base 26. This segment is laterally directed towards the shank 28, although the segment need not be radially directed towards the origin 36.

The engaging means 30 of each prong 22 in an array of prongs 22 comprising the fastening system 20 may laterally extend substantially in the same direction, if relatively unidirectionally predominant fastening system 20 characteristics, such as peel strength and shear strength desired, or may be randomly oriented to provide substantially isotropic fastening characteristics in the lateral directions. The engaging means 30 may be hook-shaped tines which project substantially from one side of the shank 28, defining a generally convex outline, and penetrate the opening of the receiving surface to intercept the strands or fibers of the receiving surface at the inner radius of curvature 54 of the engaging means 30. The interference between the engaging means 30 and strands or fibers of the receiving surface prevents release of the fastening system 20 from the receiving surface until the peel strength or shear strength of the fastening system 20 is exceeded. The engaging means 30 should not radially project too far in the lateral direction, otherwise the engaging means 30 may not penetrate the opening of the receiving surface. The cross section of the engaging means 30 should be sized to penetrate the openings of the receiving surface.

The cross sectional area and geometry of the engaging means 30 are not critical, so long as the engaging means 30 has structural integrity which provides sufficient shear and bending strengths to accommodate the desired peel and shear strengths of a fastening system 20 having an array of prongs 22 of a given density. For the embodiment described herein, a hook-shaped tine engaging means 30 having a maximum lateral projection 38 from the center of the base 26 to the remote lateral periphery of about 0.79 millimeters to about 1.4 millimeters (0.03 to 0.06 inches) is suitable.

If an array of prongs 22 is selected for the fastening system 20, the array of prongs 22 may be provided in any pattern and density as desired, to achieve the peel and shear strengths required for the particular application of the fastening system 20. Generally as the array density increases, peel strength and shear strength proportionately increase in a linear fashion. The individual prongs 22 should not be so closely spaced as to interfere with and prevent the engaging means 30 of the adjacent prongs 22 from intercepting strands or fibers of the receiving surface. If the prongs 22 are too closely spaced, compacting or matting of the receiving surface strands or fibers may occur, occluding the openings between the strands or fibers. Conversely, the prongs 22 should not be so distantly spaced as to require an excessive area of substrate 24 to provide a fastening system 20 of adequate shear and peel strengths.

It is advantageous to dispose the array of prongs 22 in rows, so that each prong 22 is generally equally spaced from the adjacent prong 22. The rows are generally oriented in the machine direction and cross-machine direction according to the manufacturing process described and claimed below. Generally, each machine direction and cross-machine direction row of prongs 22 should be equally spaced from the adjacent machine direction and cross-machine direction rows of prongs 22, to provide a generally uniform stress field throughout the fastening system 20 and the receiving surface when separation forces are applied to the fastening system 20 and the receiving surface.

As used herein the term "pitch" refers to the distance, measured either in the machine direction or cross-machine direction, between the centers of the footprints of the bases 26 of prongs 22 in adjacent rows. Typically a fastening system 20 having an array of prongs 22 with a pitch ranging from about 1.02 millimeters to about 5.08 millimeters (0.04 to 0.20 inches) in both directions is suitable, with a pitch of about 2.03 millimeters (0.08 inches) being preferred. Adjacent cross-machine direction rows are preferably offset approximately one-half pitch in the cross-machine direction to double the distance in the machine direction between the adjacent cross-machine direction rows.

The prongs 22 may be thought of as disposed in a matrix on a one square centimeter grid having an array of prongs 22 with about 2 to about 10 rows of prongs 22 per centimeter (5 to 25 rows per inch) in both the machine and cross-machine directions, preferably about 5 rows of prongs 22 per centimeter (13 rows per inch) in each direction. This grid will result in a fastening system 20 having about 4 to about 100 prongs 22 per square centimeter (25 to 625 prongs per square inch) of substrate 24.

The fastening system 20 prongs 22 may be made of any thermally sensitive material which is stable and shape retaining when solid, but not so brittle that failure occurs when the fastening system 20 is subjected to separation forces. As used herein, "thermally sensitive" refers to the property of a material which gradually changes from the solid state to the liquid state upon the application of heat. Failure is considered to have occurred when the prong 22 has fractured or can no longer sustain a reaction in the presence of and when subjected to separation forces. Preferably the material has an elastic tensile modulus, measured according to ASTM Standard D-638, of about 24,600,000 to about 31,600,000 kilograms per square meter (35,000 to 45,000 pounds per square inch).

Further, the prong material should have a melting point low enough to provide for easy processing and a relatively high viscosity to provide a tacky and tough consistency at temperatures near the material melting point, so that the shanks 28 may be stretched and the engaging means 30 easily formed according to the method of manufacture recited below. It is also important that the prongs 22 be viscoelastic, to allow for more variation in the parameters affecting prong 22 structure, and particularly the geometry of the engaging means 30. Material having a complex viscosity ranging from about 20 to about 100 Pascal seconds at the temperature of application to the substrate 24 is suitable.

The viscosity may be measured with a Rheometrics Model 800 Mechanical Spectrometer using the dynamic operating mode at a 10 Hertz sampling frequency and 10% material strain. A disk and plate type geometry is preferred, particularly with a disk having a radius of about 12.5 millimeters and a gap of about 1.0 millimeters between the disk and plate.

The prongs 22 are preferentially comprised of a thermoplastic material. The term "thermoplastic" refers to uncrosslinked polymers of a thermally sensitive material which flows under the application of heat or pressure. Hot melt adhesive thermoplastics are particularly well suited to manufacture, the fastening system 20 of the present invention, particularly in accordance with the process described and claimed below. As used herein the phrase "hot melt adhesive" refers to a viscoelastic thermoplastic which retains residual stresses upon solidification from the liquid state. Polyester and polyamide hot melt adhesives are particularly suitable and preferred. As used herein, the terms "polyester" and "polyamide" mean chains having repeating ester and amide units respectively.

If a polyester hot melt adhesive is selected, an adhesive having a complex viscosity of about 23±2 Pascal seconds at about 194° C. has been found to work well. If a polyamide hot melt adhesive is selected, an adhesive having a complex viscosity of about 90±10 Pascal seconds at about 204° C. has been found to work well. A polyester hot melt adhesive marketed by the Bostik Company of Middleton, Mass. as No. 7199 has been found to work well. A polyamide hot melt adhesive marketed by the Henkel Company of Kankakee, Ill. under the tradename Macromelt 6300 has been found to work well.

PROCESS OF MANUFACTURE

The prongs 22, described above, may be manufactured according to the process comprising the steps depositing discrete amounts of heated, thermally sensitive material onto a substrate 24 which is transported relative to the selected means for depositing the heated, thermally sensitive material. More particularly, the process comprises the steps of providing a thermally sensitive material, as disclosed above, and heating it to at least the melting point so that the heated, thermally sensitive material is in a fluidic, flowable state.

A substrate 24 is provided and transported relative to the means for depositing this heated material. A means for depositing discrete amounts of the heated, thermally sensitive material is provided. Discrete amounts of the heated, thermally sensitive material are deposited onto the substrate 24 from the depositing means. It will be apparent to one skilled in the art that the depositing means for depositing discrete amount of thermally sensitive material may be transported and the substrate 24 held stationary or, preferably, the substrate 24 transported and the depositing means held stationary, to provide the relative transport between the substrate 24 and the depositing means.

During transport of the substrate 24 and the deposition of the discrete amounts of thermally sensitive material which form the prong 22, two directions are defined. The first direction is the direction of transport of the substrate relative to the means for depositing the thermally sensitive material. The second direction is the direction of deposition of such material onto the transported substrate 24 at the time of deposition. An included angle $\beta$ is defined between the first direction of transport and the second direction of deposition.

To provide for the desired shear strength properties claimed below and a preferred prong 22 geometry, preferably the defined angle $\beta$ is obtuse. Generally, as the obtuse angle $\beta$ more nearly approaches about 100°, from either greater or lesser angles, typically a fastening system 20 having relatively greater shear strength results. It is to be recognized that the preferred angle of about 100° may vary somewhat with the means 76 selected for depositing the heated, thermally sensitive material onto the substrate 24.

During the process for deposition of the heated, thermally sensitive material onto the substrate 24, preferably a velocity differential occurs between the transported substrate 24 and the thermally sensitive material being deposited. Such a velocity differential is considered "positive" if the speed of the substrate 24 in the first direction is greater than the velocity of whatever means, such as the cells 76 in the print roll 72 used to deposit the heated, thermally sensitive material at the point of deposition of such material onto the substrate 24. Conversely, a velocity differential is considered "negative" if the speed of the transported substrate 24 is less than the velocity of the means 76 for depositing the thermally sensitive material at the point of deposition of such material onto the substrate 24. It will be apparent to one skilled in the art that if the means for depositing the heated, thermally sensitive material is held stationary and the substrate 24 is transported, a positive velocity differential always results. By providing a positive velocity differential, the viscoelastic rheological properties of the thermally sensitive material may provide for lateral stretching of the material and desirable fastening characteristics, particularly desirable shear strength resultant properties.

With continuing reference to FIG. 2, the fastening system 20 according to the present invention may be manufactured using a modified gravure printing process. Gravure printing is well known in the art as illustrated by U.S. Pat. No. 4,643,130 issued Feb. 17, 1988, to Sheath et al. and incorporated herein by reference to illustrate the general state of the art.

As illustrated by FIG. 2, the substrate 24 may be passed through the nip 70 formed between two juxtaposed rolls, a print roll 72 and a backing roll 74. The rolls 72 and 74 have substantially mutually parallel centerlines disposed generally parallel to the plane of the substrate 24. Each of the rolls 72 and 74 is rotated about its respective centerline so that the rolls 72 and 74 have substantially the same surface and direction, at the nip 70. If desired, the rolls 72 and 74 may have generally mutually equal peripheral velocities at the nip point 70 too.

If desired, both the print roll 72 and the backing roll 74 may be driven by an external motive force (not shown), or one roll driven by external motive force and the second roll driven by frictional engagement with the first roll. An alternating current electric motor having an output of about 1,500 watts has been found to provide adequate motive force. By rotating, the rolls 72 and 74 actuate a depositing means for depositing heated, thermally sensitive material onto the substrate 24 to form the prongs 22. The rolls 72 and 74 may rotate at the same or different peripheral velocities. It is only necessary that both rolls 72 and 74 rotate in the same direction at the nip point 70.

The depositing means should be able to accommodate the temperature of the material of prongs 22 in the liquid state, provide substantially uniform pitch between the prongs 22 in both the machine and cross-machine directions and yield the desired density of prongs 22 within the array. Also, the depositing means should be able to produce prongs having various diameters of the base 26 and heights of the shank 23. The print roll 72, specifically, provides for the depositing means to deposit the prongs 22 on the substrate 24 in the desired array, discussed above, (or other pattern) according to the present manufacturing process.

The phrase "depositing means" refers to any apparatus which transfers liquid prong material from a bulk quantity to the substrate 24 in dosages corresponding to individual prongs 22. The term "deposit" means to transfer prong material from the bulk form and to dose such material onto the substrate 24 in units corresponding to individual prongs 22.

One suitable depositing means for depositing prong material onto the substrate 24 is an array of one or more cells 76 in a print roll 72. As used herein the term "cell" refers to any cavity, or other component of the print roll 72, which transfers prong material from a source to the substrate 24 and deposits this material onto the substrate 24 in discrete units.

The cross sectional area of the cell 76, taken at the surface of the print roll 72, generally corresponds with the shape of the footprint of the base 26 of the prong 22. The cross section of the cell 76 should be approximately equal to the desired cross section of the base 26. The depth of the cell 76, in part, determines the longitudinal length of the prong 22, specifically the perpendicular distance from the base 26 to the point or segment of highest elevation. However, as the depth of the cell 76 increases to more than approximately 70 percent of the diameter of the cell 76, the longitudinal dimension of the prong 22 generally remains constant. This occurs because not all of the liquid prong material is pulled out of the cell 76 and deposited on the substrate 24. Due to the surface tension and viscosity of the liquid prong material, some of it will remain in the cell 76 and not be transferred to the substrate 24.

For the embodiment described herein, a blind, generally cylindrically shaped cell 76 having a depth between about 50 and about 70 percent of the diameter is adequate. If desired, the cell 76 may be somewhat frustroconically tapered in shape to accommodate conventional manufacturing processes, such as chemical etching.

If frustroconically shaped, the included angle of the taper of the cell 76 should be no more than about 45° to produce the preferred taper of the shank 28 and yield the base to highest elevation ratios discussed above. If the taper of the cell 76 has a greater included angle, a prong 22 having too much taper may result. If the included angle is too small, or the cell 76 is cylindrical, a shank 28 of generally uniform cross section may result, and thereby have areas of higher stress. For the embodiment described herein a cell 76 having an included angle of about 45°, a diameter at the roll periphery of about 0.89 millimeters to about 1.22 millimeters (0.035 to 0.048 inches) and a depth ranging from about 0.25 millimeters to about 0.51 millimeters) 0.01 to 0.02 inches produces a suitable prong 22.

The print roll 72 and backing roll 74 should be compressed, coincident with the plane connecting the centerlines of the rolls, to press the adhesive from the cells 76 in the print roll 72 onto the substrate 24 and to provide sufficient frictional engagement to drive the opposing roll if it is not externally driven. The backing roll 74 should be somewhat softer and more compliant than the print roll 72 to provide cushioning of the prong material as it is deposited on the substrate 24 from the print roll 72. A backing roll 74 having a rubber coating with a Shore A durometer hardness of about 40 to about 60 is suitable.

The print roll 72 temperature is not critical, however, the print roll 72 should be heated to prevent solidification of the prongs 22 during transfer from the source through the deposition on the substrate 24. Generally a print roll 72 surface temperature near the source material temperature is desired. A print roll 72 temperature of about 197° C. has been found to work well.

It is to be recognized that a chill roll may be necessary if the substrate 24 is adversely affected by the heat transferred from the prong material. If a chill roll is desired, it may be incorporated into the backing roll 74 using means well known to one skilled in the art. This arrangement is often necessary if a polypropylene, polyethylene or other polyolefinic substrate 24 is used.

The material used to form the individual prongs 22 must be kept in a source which provides for the proper temperature to apply the prongs 22 to the substrate 24. Typically, a temperature slightly above the melting point of the material is desired. The material is considered to be at or above the "melting point" if the material is partially or wholly in the liquid state.

If the source of the prong material is kept at too high a temperature, the prong material may not be viscous enough and may produce engaging means 30 which laterally connect to the prongs 22 adjacent in the machine direction. If the material temperature is very hot, the prong 22 will flow into a small, somewhat semispherically shaped puddle and an engaging means 30 will not be formed. Conversely, if the source temperature is too low, the prong material may not transfer from the source to the means for depositing the material or, subsequently, may not properly transfer from the depositing means 76 to the substrate 24 in the desired array or pattern. The source of the material should also impart a generally uniform cross-machine direction temperature profile to the material, be in communication with the means for depositing the adhesive material onto the substrate 24 and easily be replenished or restocked as the prong material becomes depleted.

A suitable source is a trough 80, substantially coextensive of that portion of the cross-machine dimension of the print roll 72 which has cells 76 and adjacent thereto. The trough 80 has a closed end bottom, an outboard side and ends. The top may be open or closed as desired. The inboard side of the trough 80 is open, allowing the liquid material therein to freely contact and communicate with the circumference of the print roll 72, and enter the cells 76 or communicate with any other desired means for depositing the thermally sensitive material onto the substrate 24.

The source is externally heated by known means (not shown) to maintain the prong material in a liquid state and at the proper temperature. The preferred temperature is above the melting point but below that at which a significant loss of viscoelasticity occurs. If desired, the liquid material inside the trough 80 may be mixed or recirculated to promote homogeneity and an even temperature distribution.

Juxtaposed with the bottom of the trough 80 is a doctor blade 82 which controls the amount of prong material applied to the print roll 72. The doctor blade 82 and trough 80 are held stationary as the print roll 72 is rotated, allowing the doctor blade 82 to wipe the circumference of the roll 72 and scrape any prong material which is not disposed within the individual cells 76 from the roll 72 and allows such material to be recycled. This arrangement allows prong material to be deposited from the cells 76 to the substrate 24 in the desired array, according to the geometry of the cells 76 on the circumference of the print roll 72. As seen in FIG. 2, the doctor blade 82 is preferentially disposed in the horizontal plane, particularly the horizontal apex of the print roll 72, which apex is upstream of the nip point 70.

After being deposited onto the substrate 24, the prongs 22 may be severed from the print roll 72 and the depositing means 76. If desired, severing may be accomplished as a separate, dedicated step in the process by utilizing a severing means 78 for severing the prongs 22 into the engaging means 30 of the fastening system 20 and a moil. As used herein the term "moil" refers to any material severed from the prong 22 and which does not form part of the fastening system 20. However, depending upon the adjustment of the various parameters, such as the angle γ between the substrate 24 and the depositing means 76, the velocity differential, the viscosity of the heated, thermally sensitive material, the cell 76, etc., a dedicated and separate severing step may not be necessary. Severing may occur naturally as a function of the substrate 24 being transported away from the point of deposition.

If utilized, the severing means 78 should be adjustable to accommodate various sizes of prongs 22 and lateral projections 38 of engaging means 30 and also provide uniformity throughout the cross-machine direction of the array. The term "severing means" refers to any apparatus or component which longitudinally separates the moil from the fastening system 20. The term "sever" refers to the act of dividing the moil from the fastening system 20 as described above. The severing means 78 should also be clean and should not rust, oxidize or impart corrodents and contaminates (such as moil material) to the prongs 22. A suitable severing means is a wire 78 disposed generally parallel the centerline of the rolls 72 and 74 and spaced from the substrate 24 a distance which is somewhat greater than the perpendicular distance from the highest elevation of the solidified prong 22 to the substrate 24.

Preferably the wire 78 is electrically heated to prevent build-up of the molten prong material on the severing means 78, accommodate any cooling of the prongs 22 which occurs between the time the prong material leaves the heated source and severing occurs and to promote lateral stretching of the engaging means 30. The heating of the severing means 78 should also provide for uniform temperature distribution in the cross-machine direction, so that an array of prongs 22 having substantially uniform geometry is produced.

Generally, as the prong material temperature increases, a relatively cooler hot wire 78 temperature severing means can be accommodated. Also, as the speed of the substrate 24 is decreased, less frequent cooling of the hot wire 78 occurs as each prong 22 and moil are severed, making a relatively lower wattage hot wire 78 more feasible at the same temperatures. It should be recognized that as the temperature of the hot wire 78 is increased a prong 22 having a generally shorter shank 28 length will result. Conversely, the shank 28 length and lateral length of the engaging means 30 will be increased in inverse proportion as the temperature of the hot wire 78 is decreased. It is not necessary that the severing means 78 actually contact the prong 22 for severing to occur. The prong 22 may be severed by the radiant heat emitted from the severing means 78.

For the embodiment described herein a round cross section nickel-chromium wire 78, having a diameter of about 0.51 millimeters (0.02 inches) heated to a temperature of about 343° C. to about 416° C. has been found suitable. It will be apparent that a knife, laser cutting or other severing means 78 may be substituted for the hot wire 78 described above.

It is important that the severing means 78 be disposed at a position which allows stretching of the prong material to occur prior to the prong 22 being severed from the moil. If the severing means 78 is disposed too far from the plane of the substrate 24, the prong material will pass underneath the severing means 78 and not be intercepted by it, forming a very long engaging means 30 which will not be properly spaced from the substrate 24 or adjacent prongs 22. Conversely, if the severing means 78 is disposed too close to the plane of the substrate 24, the severing means 78 will truncate the shank 28 and an engaging means 30 may not be formed.

A hot wire severing means 78 disposed approximately 14 millimeters to 22 millimeters (0.56 to 0.88 inches), preferably about 18 millimeters (0.72 inches) in the machine direction from the nip point 70, approximately 4.8 millimeters to 7.9 millimeters (0.19 to 0.95 inches) radially outward from the backing roll 74 and approximately 1.5 millimeters to approximately 4.8 millimeters (0.06 to 0.75 inches) radially outwardly from the print roll 72 is adequately positioned for the process of manufacture disclosed herein.

In operation, the substrate 24 is transported in a first direction relative to the depositing means 76. More particularly, the substrate 24 is transported through the nip 70, are preferentially drawn by a take-up roll (not shown). This provides a clean area of substrate 24 for continuous deposition of prongs 22 and removes the portions of the substrate 24 having prongs 22 deposited thereon. The direction generally parallel to the principal direction of transport of the substrate 24 as it passes through the nip 70 is referred to as the "machine direction." The machine direction, as indicated by the arrow 75 of FIG. 2, is generally orthogonal the centerline of the print roll 72 and backing roll 74. The direction generally orthogonal to the machine direction and parallel to the plane of the substrate 24 is referred to as the "cross-machine direction." The "plane of the nip" is the plane having a line coincident with the nip and tangent to the print roll 72 and to the backing roll 76.

After depositing prong material from the cell 76 onto the substrate 24, the rolls 72 and 74 continue rotation, in the directions indicated by the arrows 75 of FIG. 2. This results in a period of relative displacement between the transported substrate 24 and the cells 76 during which period (prior to severing) the prong material bridges the substrate 24 and print roll 72. As relative displacement continues, the prong material is stretched until severing occurs and the prong 22 separated from the cell 76 of the print roll 72. As used herein the term "stretch" means to increase in linear dimension, at least a portion of which increase becomes substantially permanent for the life of the fastening system 20.

As discussed above, it may also be necessary to sever the individual prongs 22 from the print roll 72 as part of the process which forms the engaging means 30. When severed, a prong 22 is longitudinally divided into two parts, a distal end and engaging means 30 which remain with the fastening system 20 and a moil (not shown) which remains with the print roll 72 and may be recycled, as desired. After the prongs 22 are severed from the moil, the fastening system 20 is allowed to freeze prior to contact of the prongs 22 with other objects. After solidification of the prongs 22, the substrate 24 may be wound into a roll for storage as desired.

The substrate 24 may be transported through the nip 70 in the first direction at about 3 to about 31 meters per minute (10 to 100 feet per minute). The substrate 24 may be drawn through the nip 70 at a speed ranging from approximately 25% greater than to approximately 15% less than the peripheral speed of said print roll 72, producing a 25 percent positive velocity differential to 15 percent negative velocity differential. Preferably there is positive velocity differential of at least 2%. Therefore if the apparatus of FIG. 2 is utilized, the speed of the transported substrate 24 is at least about 2% greater than the surface speed of the print roll 72.

The fastening characteristics, particularly the shear strength, of the fastening system 20 or of an individual prong 22, may also be influenced by the included angle $\beta$ formed between two directions involved in the dynamic steps of this process, the first direction being the principal direction of transport of the substrate 24, and the second direction being the direction which the heated, thermally sensitive material is applied to the transported substrate 24. A particular included angle $\gamma$ occurs if the described print roll 72, backing roll 74 and nip 70 apparatus is utilized as the depositing means 76 for depositing heated, thermally sensitive material onto the transported substrate 24. It will be apparent to one skilled in the art that if this apparatus is used to deposit the heated, thermally sensitive material onto the substrate 24, at the time of deposition the included angle $\gamma$ will be approximately 90° as the first direction of transport of the substrate 24 through the nip 70 is generally orthogonal the second direction which the heated, thermally sensitive material is extracted from a cell 76 in the periphery of the print roll 72.

As noted above, the substrate 24 may be drawn away from the plane of the nip 70 of the print roll 72 at a particular angle $\gamma$, which angle $\gamma$ is acute relative to the plane of the nip 70 and obtuse relative to the direction of deposition of the heated, thermally sensitive material onto the transported substrate 24. Typically, as the included angle $\gamma$ (between the direction of transport of the web after leaving the nip 70 and the plane of the nip 70) or, more generally, the included angle $\beta$ (between the first direction of the transported substrate 24 and the second direction of deposition of heated, thermally sensitive material) onto the transported substrate 24 decreases, a fastening system 20 having relatively higher shear strength results, as illustrated in the Figures below and discussed hereinafter in more detail.

This relationship generally holds true, regardless of the relative velocity differential between the transported substrate 24 and the means 76 for depositing heated, thermally sensitive material onto the transported substrate 24. This relationship is also true for both positive velocity differentials and negative velocity differentials. A process wherein the transported substrate 24 is drawn at an obtuse angle $\beta$ relative to the direction of deposition of the heated, thermally sensitive material onto the transported substrate of about 100° to about 110° and more specifically wherein transported substrate 24 is drawn away from the plane of the nip 70 at an included angle $\gamma$ of about 5° to about 40° has been found to work well.

Figure 3:
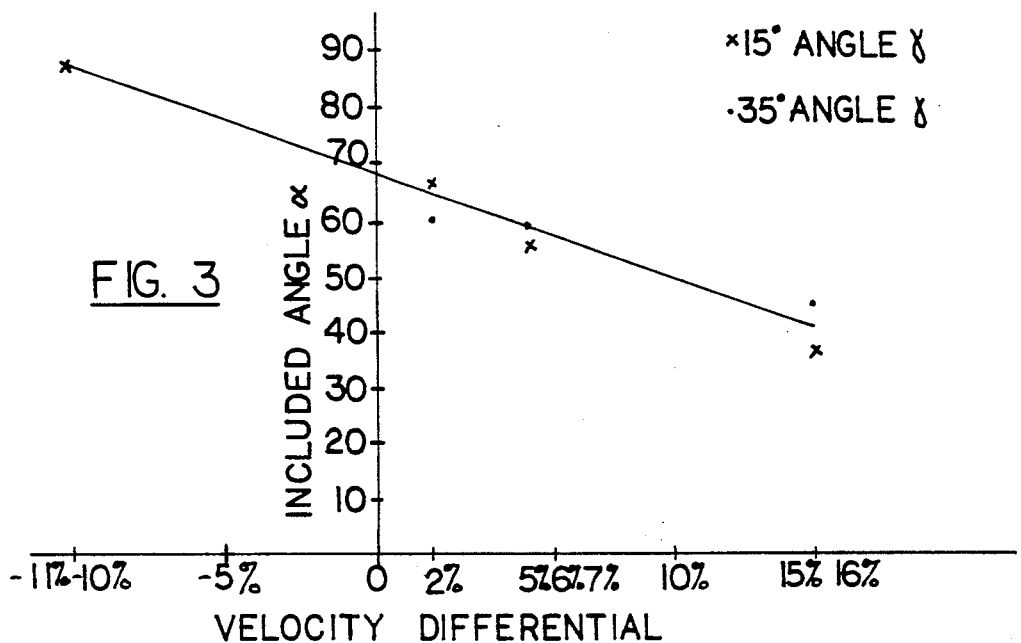
FIG. 3 is a graphical representation of the effect of the velocity differential between the transported substrate and the depositing means on the included angle of the shank of the prong for two different included angles between the substrate and the nip plane.

Referring to FIG. 3, it can be seen that generally as the positive velocity differential becomes greater, the included angle $\alpha$ of the prongs 22 relative to the substrate 24 decreases, and hence the prongs 22 become more laterally oriented and more nearly parallel the plane of the substrate 24. This relationship is true and substantially linear for two selected included angles $\gamma$ of 15° and 35° between the plane of the nip 70 and the line through which the substrate 24 is drawn away from the nip 70, and encompasses the range from a negative 11% velocity differential to a positive 16% velocity differential.

Figure 4:
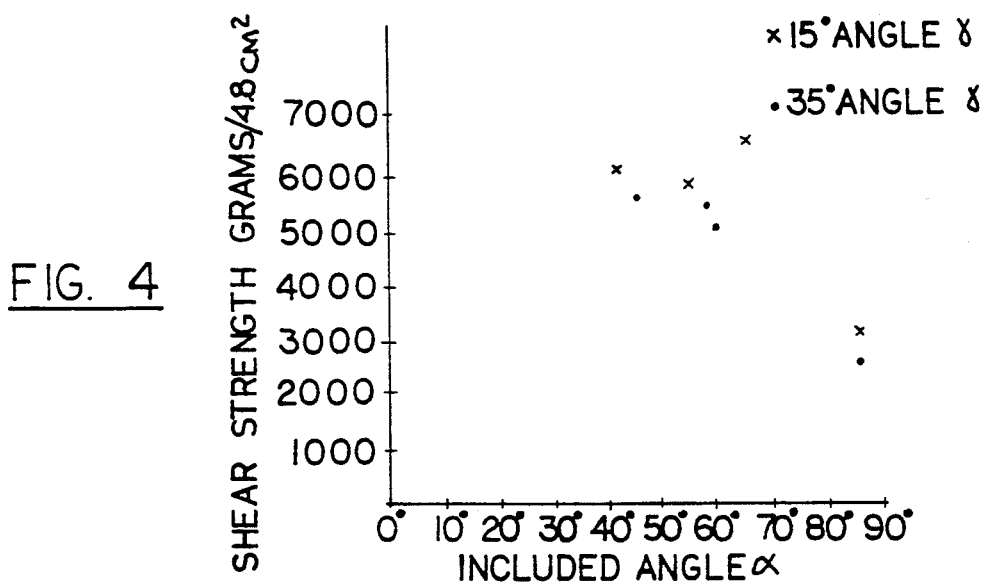
FIG. 4 is a graphical representation of the effect of the included angle of the shank of the prong on the shear strength of the mechanical fastening system for two different included angles between the substrate and the nip plane.

Referring to FIG. 4, the shear strength of a sample of the mechanical fastening system 20 is measured in grams force of a sample of the fastening system 20 having an area of about 4.84 square centimeters (0.75 square inches). This sample size was selected because it is large enough to yield a representative evaluation of the sample and is typical of the sizes used in the aforementioned application. The shear strength is tested using the aforementioned 16110 model material sold by the Guilford Loop Corporation as a receiving surface. The shear force may be measured by tensile pulling a fastened fastening system 20 and a receiving surface in opposite directions, which directions are generally parallel the planes of the respective substrate 24 and the plane of the receiving surface. During the measurement, the included angle α of the prongs 22 is generally oriented in the same direction which the substrate 24 is pulled by the tensile machine (the prong 22 of FIG. 1 is pulled to the right). The method used to determine the resistance of a fastening system 20 to shear forces is more fully set forth in U.S. Pat. No. 4,699,622 issued Oct. 13, 1987 to Toussant et al., which patent is incorporated herein by reference for the purpose of describing a suitable technique for the measurement of shear forces.

According to FIG. 4, it is seen that the shear strength of the fastening system 20 is related to the included angle α of the shanks 28 of the prongs 22, and hence to the velocity differential, through the relationship exhibited by FIG. 3. As illustrated by FIG. 4, it is preferred that the angle α between the shanks 28 and the substrate 24 be less than about 70°, and preferably less than about 65°, to maintain a shear strength of at least about 1,000 grams per 4.8 square centimeters, because it can be seen that the shear strength rapidly falls off as the shanks 28 become more perpendicularly oriented relative to the substrate than about 65°–70°. Also from FIG. 4 it can be seen that for all recorded values of included shank angles α, greater shear strengths are obtained if the substrate 24 is drawn away from the plane of the nip 70 at a 15° angle γ rather than the greater 35° angle γ.

From FIG. 4 it can be seen that generally, it is desired to have the included angle α between the shank 28 of the prong 22 and the substrate 24 less than 70°. Particularly, an included angle α of about 20° to about 65° is desired. This relationship again holds true for both of the included angles γ between the plane of the nip 70 and the line through which the substrate 24 is drawn after leaving the nip 70.

Figure 5:
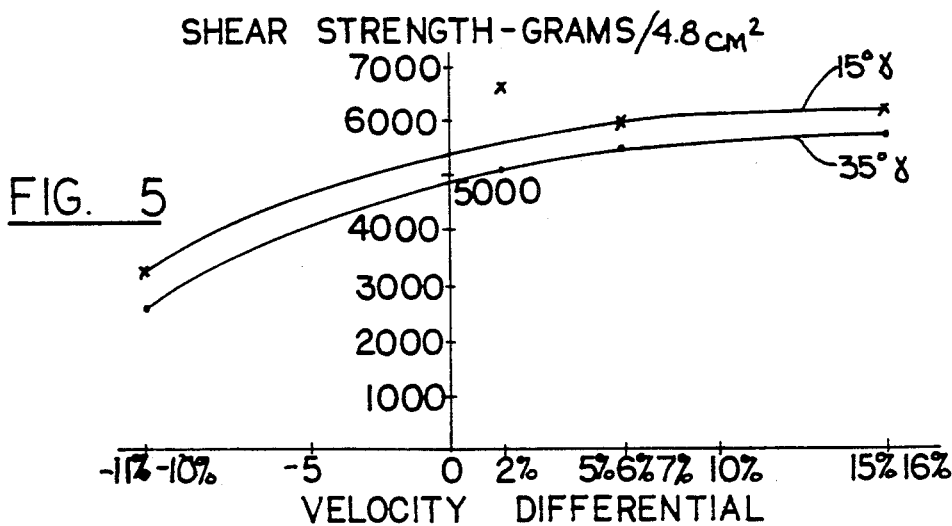
FIG. 5 is a graphical representation of the effect of both positive and negative velocity differentials on the shear strength of a fastening system for two different included angles between the substrate and the nip plane.

FIG. 5 illustrates the relationship between the velocity differential of the transported web 24 and the shear strength of the mechanical fastening system 20 produced by such a velocity differential. Both positive and negative velocity differentials are illustrated in this Figure. However, generally, FIG. 5 illustrates that a positive velocity differential of about 2 to about 16% is desirable. This relationship again holds true for both of the disclosed included angles γ between the plane of the nip 70 and the line through which the transported substrate 24 is drawn after leaving the nip 70.

Another factor to be considered by one skilled in the art is the radius of curvature of the print roll 72 and its relationship to the velocity differential and the angle γ between the substrate 24 and the plane of the nip 70. As the radius of curvature of the print roll 72 decreased, the moil and shank 28 of the prong 22 being formed are drawn away from the substrate 24 at an angle which, in the vicinity of the nip 70 is more nearly orthogonal the plane of the nip 70. Upon solidification, such a prong 22 will typically have a relatively greater included angle α than a prong 22 manufactured under conditions which are similar, except for the use of a larger radius of curvature print roll 72.

Thus, to obviate a decrease in shear strength from occurring, based upon the relationship of FIG. 4, as the radius of curvature of the print roll 72 decreases, either or both of the velocity differential and the included angle γ between the transported substrate 24 and the plane of the nip 70 should also be decreased. If the radius of curvature of the print roll 72 is increased or decreased without corresponding compensation to the velocity differential or to the included angle γ, the angle α of the prong 22, and thus the shear strength of the fastening system 20, may not have the shear strength desired for the application. Particularly, if the velocity differential and included angle γ are not matched to the radius of curvature of the print roll 72, the moil of the prong 22 may be oriented too orthogonal relative to the substrate 24, and, upon solidification, the included angle α of the prong 22 will be greater than desired, resulting in a fastening system 20 of lesser shear strength than is desired.

Thus, to provide an improved fastening system 20 according to the present invention, it is important to provide with the apparatus used to manufacture the fastening system 20 a means for imparting a vector orientation which is not orthogonal (more than about 10° off axis in any direction) the plane of the substrate 24 at the base 26 of the prong 22 to the discrete amounts of deposited, thermally sensitive material. If the apparatus of FIG. 2 is utilized, two means for imparting a nonorthogonal to the substrate 24 vector orientation to the discrete deposits of thermally sensitive material include the aforementioned velocity differential and the acute angle γ between the plane of the nip 70 and the transported substrate 24.

Several variations of the disclosed apparatus and method are feasible and within the scope of the claimed invention. If desired, by providing a relatively strong substrate 24 and sufficient tension, the backing roll 74 of the apparatus of FIG. 2 may be omitted. Instead, as is well known to one skilled in the art, the substrate 24 may wrap the print roll 72 by the use of tracking rolls which produce an S-shaped arc about the printing roll 72. In this configuration, there is no nip 70 as disclosed in FIG. 2, but, rather, the tension of the substrate 24 provides for deposition of the heated, thermally sensitive material from the cells 76 of the print roll 72. However, it is to be recognized that if this variant configuration is selected for the apparatus and means 76 for depositing the heated, thermally sensitive material onto the substrate 24, the substrate 24 must have sufficient tensile strength to avoid tearing and to maintain the tension necessary for proper deposition of the heated thermally sensitive material.

EXAMPLES

Provided below are four illustrative, nonlimiting examples of how the various parameters of the manufacturing process may be combined, varied, held constant and utilized to produce refastenable fastening systems 20 having a desired structure, geometry or shear strength. A representative prong 22 for the fastening system 20 of each Example is shown in FIGS. 6A–9B.

Considering first the parameters held constant for all four Examples, each of the following Examples use the aforementioned Bostik polyester 7199 hot melt adhesive. The adhesive is maintained at a temperature of about 179°–181° C. (355°–358° F.). This adhesive is deposited on a 0.13–0.18 millimeter (0.005–0.007 inches) thick bleached kraft paper substrate 24 transported at a constant rate of about 6.31 meters per minute (20.7 feet per minute).

The apparatus selected for deposition of the heated, thermally sensitive material is similar to that of FIG. 2 and has an approximately 16 centimeter (6.3 inches) diameter print roll 72 and an approximately 15.2 centimeter (6.0 inches) diameter backing roll 74. The print roll 72 has an array of blind frustroconical cells 76, each about 1.0 millimeters (0.040 inches) in diameter at the periphery of the print roll 72, about 0.46 millimeters (0.018 inches) deep and disposed in a matrix of about 75 cells per square centimeter (484 cells per square inch).

Each Example incorporates a severing means 78, particularly a 0.76 millimeter (0.030 inch) diameter hot wire 78 about 61 centimeters (24 inches) long. The hot wire 78 is horizontally disposed about 5.1 millimeters (0.2 inches) from the print roll 72 and about 22.9 millimeters (0.9 inches) from the backing roll 74 for each Example. The hot wire 78 is electrically heated.

Considering next the parameters varied throughout the Examples, the electric power applied to the hot wire 78 is adjusted, according to the distance from the hot wire 78 to the substrate 24 and the speed of the print roll 72 to account for the cooling which occurs between the periphery of the hot wire 78 and the surfaces of the prongs 22 made according to the various Examples. The angle $\beta$ between the depositing means 76 and the substrate 24 is varied to show the effect of two different angles $\beta$. Specifically, the Examples utilize angles $\gamma$ of 15° and 35° between the transported substrate 24 and the plane of the nip 70. Also, the velocity differential between the depositing means 76 and the transported substrate 24 was varied and includes both positive and negative velocity differentials. For each Example, either the velocity differential is held constant and the angle $\gamma$ adjusted or vice versa, so that both parameters are not adjusted in the same Example.

EXAMPLE I

Figure 6A:
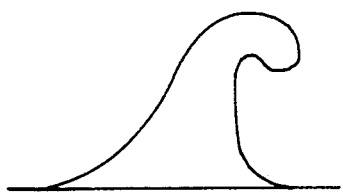
FIGS. 6A and 6B illustrate two prongs produced according to the present invention, each having same positive velocity differential between the transported substrate and the print roll and having different included angles between the transported substrate and the plane of the nip of the apparatus of FIG. 2.
Figure 6B:
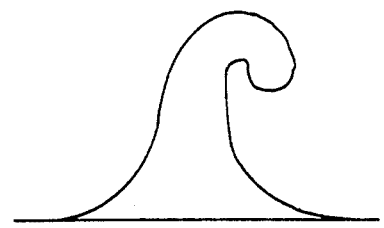

Referring to FIGS. 6A and 6B, the prong 22 of FIG. 6A is produced according to the parameters of Table IA and the prong 22 of FIG. 6B is produced according to the parameters of Table IB. Both prongs are manufactured with a positive 2% velocity differential, but vary the included angle $\gamma$ between the plane of the nip 70 and the transported substrate 24 from an acute angle of 15° to an acute angle of 35°. Otherwise, the parameters used in the process of producing the prongs of FIGS. 6A and 6B are the same.

It can be noted from the bottom portion of Tables IA and IB that, consistent with the illustrations of FIGS. 4 and 5, the prong 22 having a 15° included angle $\gamma$ yields a shear strength almost 35% greater than that of the prong 22 of FIG. 6B having the 35° included angle $\gamma$. The prong 22 of FIG. 6B is, however, almost 25% taller and has a lesser lateral projection.

|  | TABLE IA | TABLE IB |
| --- | --- | --- |
| OPERATING PARAMETERS |  |  |
| Velocity Differential | +2% | +2% |
| Angle $\gamma$ Between the Web and The Nip Plane | 15° | 35° |
| Hot Wire Power (Watts) | 95.2 | 95.2 |
| PRONG CHARACTERISTICS |  |  |
| Shear Strength (gr./4.8 sq. cm) | 6,600 | 5,100 |
| Included Angle $\alpha$ | 66° | 60° |
| Maximum Lateral Projection (0.01 inches) | 2.14 | 1.45 |
| Height (0.01 inches) | 2.23 | 2.78 |
| Engaging Means Diameter (0.001 inches) | 6 | 7 |

EXAMPLE II

Figure 7A:
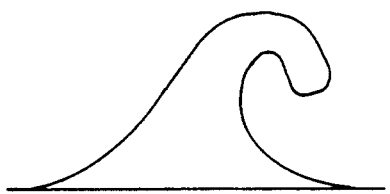
FIGS. 7A and 7B illustrate two prongs produced according to the present invention, each having same positive velocity differential between the transported substrate and the print roll and having different included angles between the transported web and the plane of the nip of the apparatus of FIG. 2.
Figure 7B:
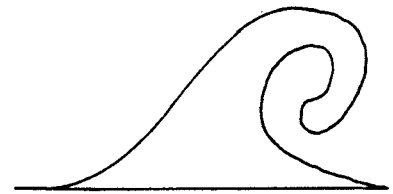

FIGS. 7A and 7B illustrate the prongs made according to the parameters of Tables IIA and IIB respectively and are directed to prongs having a positive 6.6% velocity differential but which vary the included angle $\gamma$ between the plane of the nip 70 and the direction of the transported substrate 24 from about 15° to about 35°. The engaging means 30 of the prong 22 of FIG. 7B has a significant re-entrant orientation back towards origin 36 of the base 26. However, consistent with FIGS. 4 and 5, the prong 22 of FIG. 7A exhibits approximately 7% greater shear strength than the prong 22 of FIG. 7B. One explanation for the increased sheer strength of the prongs 22 of FIG. 7 is that the re-entrant orientation of the engaging means 30 prevents a substantial number of the fibers of the receiving surface from being intercepted by the fastening system 20 and, such nonintercepted fibers do not provide significant resistance to shear forces.

|  | TABLE IIA | TABLE IIB |
| --- | --- | --- |
| OPERATING PARAMETERS |  |  |
| Velocity Differential | +6.6% | +6.6% |
| Angle $\gamma$ Between the Web and The Nip Plane | 15° | 35° |
| Hot Wire Power (Watts) | 80.0 | 95.2 |
| PRONG CHARACTERISTICS |  |  |
| Shear Strength (gr./4.8 sq. cm) | 5,900 | 5,500 |
| Included Angle $\alpha$ | 55° | 58° |
| Maximum Lateral Projection (0.01 inches) | 1.94 | 2.28 |
| Height (0.01 inches) | 2.24 | 2.45 |
| Engaging Means Diameter (0.001 inches) | 6 | 5 |

EXAMPLE III

Figure 8A:
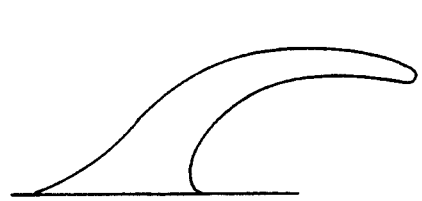
FIGS. 8A and 8B illustrate two prongs produced according to the present invention, each having the same included angle between the transported substrate and the plane of the nip of the apparatus of FIG. 2 and having different positive velocity differentials between the transported substrate and the print roll.
Figure 8B:
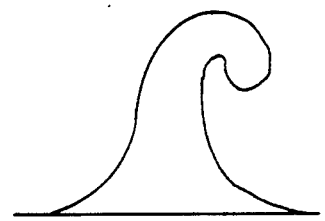

Example III varies the velocity differential between two prongs 22 each having the same included angle $\gamma$ between the plane of the nip 70 and the plane of the transported substrate 24. The constant angle $\gamma$ for both prongs 22 of FIGS. 8A and 8B is approximately 35°. The prong 22 of FIG. 8A has a positive velocity differential of about 16% while the prong of FIG. 8B is the prong 22 of FIG. 6B having a positive 2% velocity differential. It will be apparent to one skilled in the art that the engaging means 30 of the prong 22 of FIG. 8A has a very great maximum lateral projection 38, almost 71% greater than that of FIG. 8B. The prong 22 of FIG. 8A has such a great lateral projection 38 that the prong 22 may laterally slip, parallel to the plane of the substrate 24, while engaged with the receiving surface, providing, of course, such slippage is generally aligned with the profile direction of the prong 22.

Also, the prong 22 of FIG. 8A has a shear strength almost 10% greater than the prong of FIG. 8B. This result is consistent with the presentations of FIGS. 3, 4 and 5. As the velocity differential increases, the included angle $\alpha$ decreases, per FIG. 3, and, hence, the shear strength increases per FIG. 4. Also, as the velocity differential increases, so does the shear strength, per FIG. 5.

|  | TABLE IIIA | TABLE IIIB |
| --- | --- | --- |
| OPERATING PARAMETERS |  |  |
| Velocity Differential | +16% | +2% |
| Angle $\gamma$ Between the Web and The Nip Plane | 35° | 35° |
| Hot Wire Power (Watts) | 128 | 95.2 |
| PRONG CHARACTERISTICS |  |  |
| Shear Strength (gr./4.8 sq. cm) | 5,600 | 5,100 |
| Included Angle $\alpha$ | 45° | 60° |

-continued

|  | TABLE IIIA | TABLE IIIB |
|---|---|---|
| Maximum Lateral Projection (0.01 inches) | 4.15 | 1.45 |
| Height (0.01 inches) | 1.97 | 2.78 |
| Engaging Means Diameter (0.001 inches) | 3 | 7 |

Comparing the results of Examples I and III one notices that both the highest and lowest shear strength values occur in the prongs 22 of Example I having the positive 2% velocity differential. This difference in shear strength implies that at lower positive velocity differentials the manufacturing process is more sensitive about changes in the included angle γ between the substrate 24 and the plane of the nip 70.

EXAMPLE IV

Figure 9A:
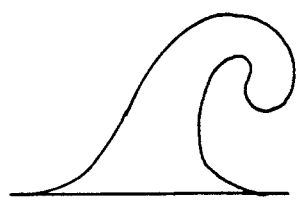
FIGS. 9A and 9B illustrate two prongs produced according to the present invention, each having the same negative velocity differential between the transported substrate and the print roll and having different included angles between the transported substrate and the plane of the nip of the apparatus of FIG. 2.
Figure 9B:
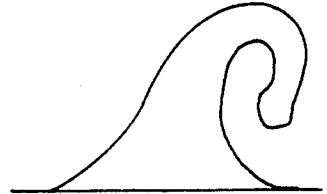

Referring to FIGS. 9A and 9B, the prongs 22 produced according to the parameters of these Figures each have a negative 11% velocity differential and exhibit substantially reduced shear strengths compared to the prongs 22 of the preceding Examples. However, consistent with FIGS. 4 and 5, the prong 22 of FIG. 9A having the 15° included angle γ between the transported substrate 24 and the plane of the nip 70 exhibited almost 27% greater shear strength than the prong of FIG. 9B having the 35° included angle γ between the transported substrate 24 and the plane of the nip 70.

|  | TABLE IVA | TABLE IVB |
|---|---|---|
| OPERATING PARAMETERS |  |  |
| Velocity Differential | −11% | −11% |
| Angle γ Between the Web and The Nip Plane | 15° | 35° |
| Hot Wire Power (Watts) | 80.0 | 80.0 |
| PRONG CHARACTERISTICS |  |  |
| Shear Strength (gr./4.8 sq. cm) | 3,300 | 2,600 |
| Included Angle α | 87° | 86° |
| Maximum Lateral Projection (0.01 inches) | 1.85 | 2.05 |
| Height (0.01 inches) | 2.46 | 2.52 |
| Engaging Means Diameter (0.001 inches) | 6 | 5 |

It will be apparent to one skilled in the art that various other modifications and combinations of the parameters described above may be utilized. For example, multiple parameters may be adjusted, including different hot wire 78 temperatures, different hot wire 78 positions, other velocity differentials, and different means for depositing the heated, thermally sensitive material onto the transported web 24 are feasible. All such combinations and permutations are within the scope of the following claims.

What is claimed is:

1. A process for producing free formed prongs of a mechanical fastening system, said process comprising the steps of:
   providing a thermally sensitive material;
   heating said thermally sensitive material to at least the melting point so that said thermally sensitive material is flowable, and can be deposited onto a substrate;
   providing a substrate;
   providing a means to deposit discrete amounts of said thermally sensitive material onto said substrate providing a means for imparting a nonorthogonal-to-the-substrate vector orientation to said deposited material;
   transporting said substrate in a first direction and at a first velocity relative to said depositing means;
   depositing discrete amounts of said flowable thermally sensitive material onto said transported substrate in a second direction relative to said first direction of transport;
   imparting a nonorthogonal-to-the-substrate vector component to said discrete amounts of said deposited material so that each of said discrete amounts of said deposited material forms a prong having a shank attached to said substrate at a base and an engaging means, said engaging mans being nonorthogonal to said substrate; and
   freezing said prongs so that said flowable material solidifies until rigid.

2. A process for producing free formed prongs of a mechanical fastening system, said process comprising the steps of:
   providing a thermally sensitive material;
   heating said thermally sensitive material to at least the melting point so that said thermally sensitive material is flowable, and can be deposited onto a substrate;
   providing a substrate;
   transporting said substrate in a first direction at a first velocity;
   providing a first roll juxtaposed with one side of aid transported substrate and adapted to rotate about its centerline, which centerline is generally parallel the plane of said substrate and generally perpendicular said first direction of transport;
   providing cells on the periphery of said first roll;
   disposing said flowable thermally sensitive material in said cells;
   axially rotating said first roll at a peripheral surface velocity unequal to said first velocity of said substrate;
   depositing discrete amounts of said flowable thermally sensitive material from said cells onto said transported substrate;
   imparting a nonorthogonal-to-the-substrate vector component to said discrete amounts of said deposited material so that each of said discrete amounts of said deposited material forms a prong having a shank attached to said substrate at a base and an engaging means, said engaging means being nonorthogonal to said substrate; and
   freezing said prongs so that said flowable material solidifies until rigid.

3. The process according to claim 2 wherein said peripheral velocity of said transported substrate is about 25% greater to about 15% less than said first velocity of said first roll.

4. The process according to claim 2 further comprising the steps of:
   providing a backing roll juxtaposed with the other side of said transported substrate and having a centerline generally parallel said centerline of said first roll;
   juxtaposing said first roll and said backing roll to define a nip and a nip plane therebetween;
   rotating said first roll and said backing roll at substantially mutually different peripheral surface velocities at said nip;

transporting said substrate through said nip in said first direction; and drawing said substrate away from the plane of said nip at an angle.

5. The process according to claim 4 wherein said substrate is drawn from said nip plane at an included angle of about 5 degrees to about 40 degrees.

6. A process for increasing the sheer strength of free formed mechanical fastening prongs, said process comprising the steps of:

providing a thermally sensitive material;

heating said thermally sensitive material to at least the melting point so that said thermally sensitive material is flowable, and can be deposited onto a substrate;

providing a substrate;

providing a means to deposit discrete amounts of said flowable thermally sensitive material onto said substrate, said depositing means being juxtaposed with said substrate;

transporting said substrate in a first direction and at a first velocity relative to said depositing means;

depositing discrete amounts of said flowable thermally sensitive material onto said transported substrate in a second direction relative to said first direction;

drawing said transported substrate away from said depositing means at an obtuse angle to impart a nonorthogonal-to-the-substrate vector component to said discrete amounts of said deposited material imparting a nonorthogonal-to-the-substrate vector component to said discrete amounts of said deposited material so that each of said discrete amounts of said deposited material forms a prong having a shank and an engaging means, said engaging means being nonorthogonal to said substrate; and freezing said prongs so that said flowable material solidifies until rigid.

7. The process according to claim 6 wherein said obtuse angle is about 100 degrees to about 110 degrees.

8. The process according to claim 6 wherein the angle between said first direction of transported substrate and said second direction of deposition is about 90 degrees at the time of said deposition.

9. The process according to claim 8 wherein said step of depositing discrete amounts of said thermally sensitive material comprises:

providing a first roll juxtaposed with one side of said transported substrate and adapted to rotate about its centerline, which centerline is generally parallel the plane of said substrate and generally perpendicular to the first direction of transport;

providing cells on the periphery of said first roll;

providing a backing roll juxtaposed with the other side of said transported substrate and having a centerline generally parallel to said centerline of said first roll;

juxtaposing said first roll and said backing roll to define a nip and a nip plane therebetween;

rotating said first roll and said backing roll in the same direction at said nip;

disposing said thermally sensitive material in said cells;

depositing discrete amounts of said thermally sensitive material from said cells onto said transported substrate;

transporting said substrate through said nip in said first direction;

drawing said substrate away from the plane of said nip at an acute included angle; and adjusting said included angle between said substrate and said plane of said nip as said substrate is transported through said nip to not less than about 5 degrees.

10. A process for increasing the shear strength of free formed mechanical fastening prongs, said process comprising the steps of:

providing a thermally sensitive material;

heating said thermally sensitive material to at least the melting point so that said thermally sensitive material is flowable, and can be deposited onto a substrate;

providing a substrate;

transporting said substrate in a first direction and at a first velocity;

providing a means to deposit discrete amounts of said thermally sensitive material onto said transported substrate;

depositing discrete amounts of said flowable thermally sensitive material onto said transported substrate to form mechanical fastening prongs so that a positive velocity differential occurs between said transported substrate and material being deposited;

imparting a nonorthogonal-to-the-substrate vector component to said discrete amounts of said deposited material so that each of said discrete amounts of said deposited material forms a prong having a shank attached to said substrate at a base and an engaging means, said engaging means being nonorthogonal to said substrate; and freezing said prong so that said flowable material solidifies until rigid.

11. The process according to claim 10 wherein said step of depositing discrete amounts of material comprises the steps of:

providing a first roll juxtaposed with one side of said transported substrate and adapted to rotate about its centerline, which centerline is generally parallel the plane of said substrate and generally perpendicular to the first direction of transport;

providing cells on the periphery of said first roll;

disposing said thermally sensitive material in said cells, axially rotating said first roll at a peripheral surface velocity unequal to said first velocity of said substrate;

depositing discrete amounts of said flowable thermally sensitive material from said cells onto said transported substrate;

rotating said first roll about its centerline;

transporting said substrate through said nip in said first direction in contacting relationship with said cells of said first roll; and increasing said first velocity of said transported substrate relative to said peripheral speed of said first roll so that said first velocity of said transported substrate is greater than said peripheral surface speed of said first roll.

12. The process according to claim 10 wherein said transported substrate is transported in contacting relationship with said cells at a first velocity at least about 2% greater than said velocity of said rotated cells so that a positive velocity differential of at least about 2% results.

13. A method for decreasing the included angle of free formed mechanical fastening prongs, said method comprising the steps of:

providing a thermally sensitive material;

heating said thermally sensitive material to at least the melting point so that said thermally sensitive material is flowable, and can be deposited onto a substrate;

providing a substrate;

transporting said substrate in a first direction and at a first velocity;

providing a first roll juxtaposed with one side of said transported substrate and adapted to rotate about its centerline, which centerline is generally parallel the plane of said substrate and generally perpendicular to the first direction of transport;

providing cells on the periphery of said first roll;

disposing said flowable thermally sensitive material in said cells, axially rotating said first roll at a peripheral surface velocity unequal to said first velocity of said substrate;

depositing discrete amounts of said flowable thermally sensitive material onto said transported substrate;

providing a backing roll juxtaposed with the other side of said transported substrate and having a centerline generally parallel to said centerline of said first roll;

juxtaposing said first roll and said backing roll to define a nip and a nip plane therebetween;

rotating said first roll and said backing roll in the same direction at said nip;

transporting said substrate through said nip in said first direction;

drawing said substrate away from the plane of said nip at an angle;

increasing said first velocity of said transported substrate relative to said peripheral speed of said first roll so that said first velocity of said transported substrate is greater than said peripheral surface speed of said first roll;

transporting said substrate through said nip at a surface velocity of about 2 to about 16 percent greater than said peripheral speed of said first roll;

imparting a nonorthogonal-to-the-substrate vector component to said discrete amounts of said deposited material so that each of said discrete amounts of said deposited material forms a prong having a shank attached to said substrate at a base and an engaging means, said engaging means being nonorthogonal to said substrate; and freezing said prongs so that said flowable material solidifies until rigid.

* * * * *